June 19, 1923.
A. A. DENSMORE
POWER TRANSMISSION MECHANISM
Filed June 27, 1921
1,459,578
2 Sheets-Sheet 2
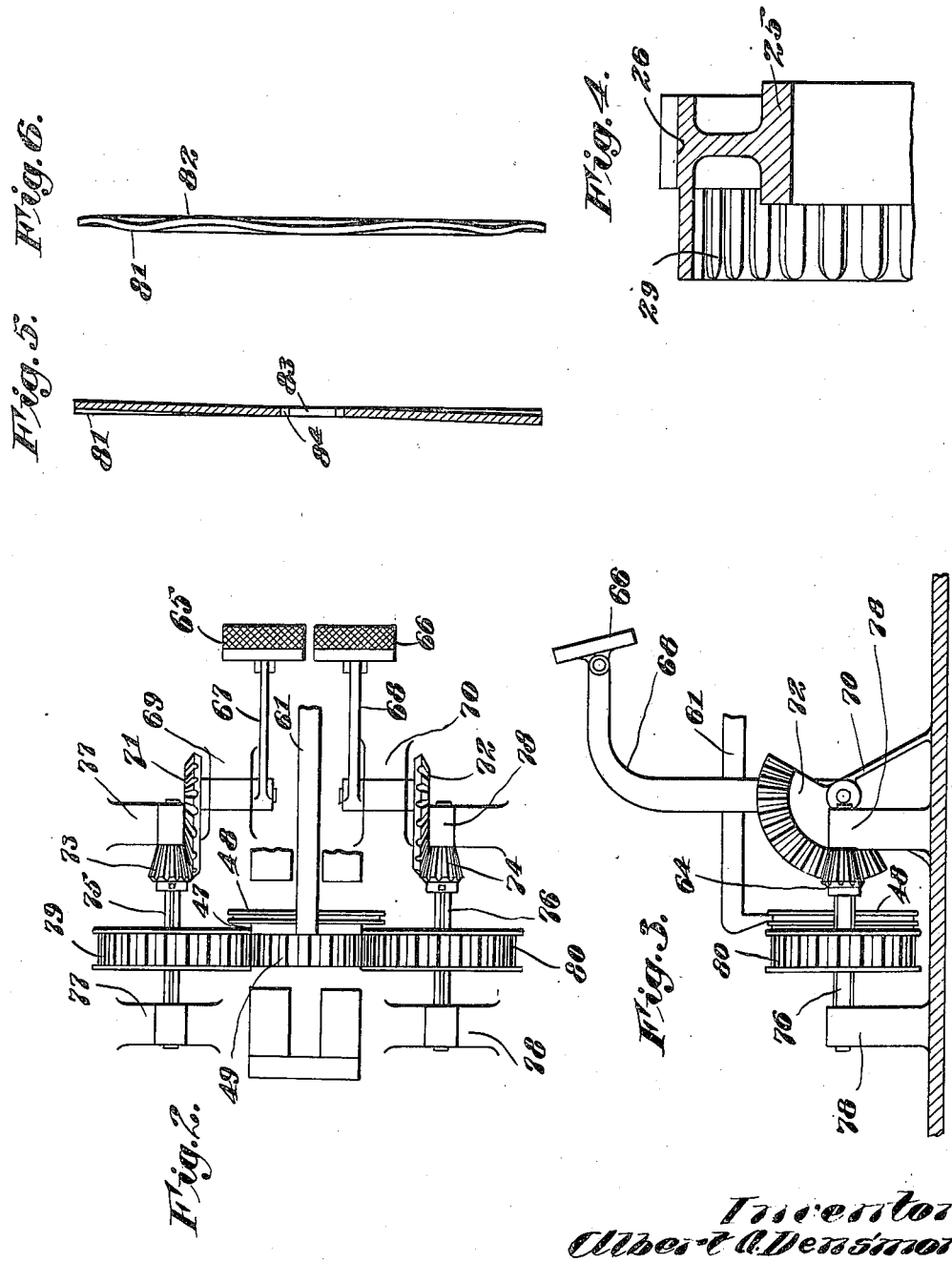

Patented June 19, 1923.

1,459,578

UNITED STATES PATENT OFFICE.

ALBERT A. DENSMORE, OF BOSTON, MASSACHUSETTS.

POWER-TRANSMISSION MECHANISM.

Application filed June 27, 1921. Serial No. 480,557.

*To all whom it may concern:*

Be it known that I, ALBERT A. DENSMORE, a citizen of the United States of America, and resident of Boston, in the county of Suffolk and State of Massachusetts, have invented new and useful Improvements in Power-Transmission Mechanism, of which the following is a specification.

This invention concerns power transmission mechanism and relates more particularly to means for operating the parts of a friction clutch and for coordinating such operation with the shifting of direct and reverse drive gearing.

The invention particularly contemplates, although not necessarily limited to, a transmission mechanism useful in the operation of motor boats or other vehicles, and wherein a drive shaft, receiving its power directly from the motor, actuates an intermediate shaft by means of a friction clutch, the latter shaft in turn operating the propeller or transmission shaft either directly or through reverse gearing.

In mechanism of this general character, it is usual to interpose a friction clutch between the motor and the direct or reverse-drive change gearing in order to avoid imposing the load upon the motor too abruptly. When such a clutch is employed, it is desirable, first to engage the connecting gears, and then to throw in the friction clutch, but this, in most cases, necessitates the employment of independent controllers for shifting the gears and actuating the clutch.

The principal object of the present invention is to provide a simple and improved arrangement whereby the shifting of the gears for direct or reverse driving and the engagement of the friction clutch elements may be accomplished in properly timed relation by the actuation of a single controlling element.

It is quite desirable that the steersman of a motor boat or other vehicle have the clutch and change gear mechanism under his direct control, but as his hands may be fully occupied in steering, it is desirable to provide foot actuated means for operating the clutch and reverse gearing. A further object therefore of the present invention is the provision of treadle means of such character as to permit of the proper actuation of the clutch and gear shifting means by the feet of the operator and with a minimum of conscious effort on his part.

As it is necessary for practical purposes that the parts be automatically retained in position after being shifted, a further object of the invention is to provide a gear and clutch shifting device of such character that the parts controlled thereby are automatically retained in whatever position they may be placed.

As exemplifying means adapted for carrying into effect the above objects, a desirable arrangement of parts is illustrated in the accompanying drawings wherein,—

Fig. 2 is a plan view with certain of the parts broken away, illustrating treadle means for operating the clutch shifting device;

Fig. 3 is a side elevation of the parts shown in Fig. 2;

Fig. 4 is a fragmentary detail to enlarge scale illustrating in transverse section a compound gear wheel employed in the apparatus; and Figs. 5 and 6 are a transverse cross section and an edge elevation respectively of a form of friction disc which may be employed.

Figure 1:
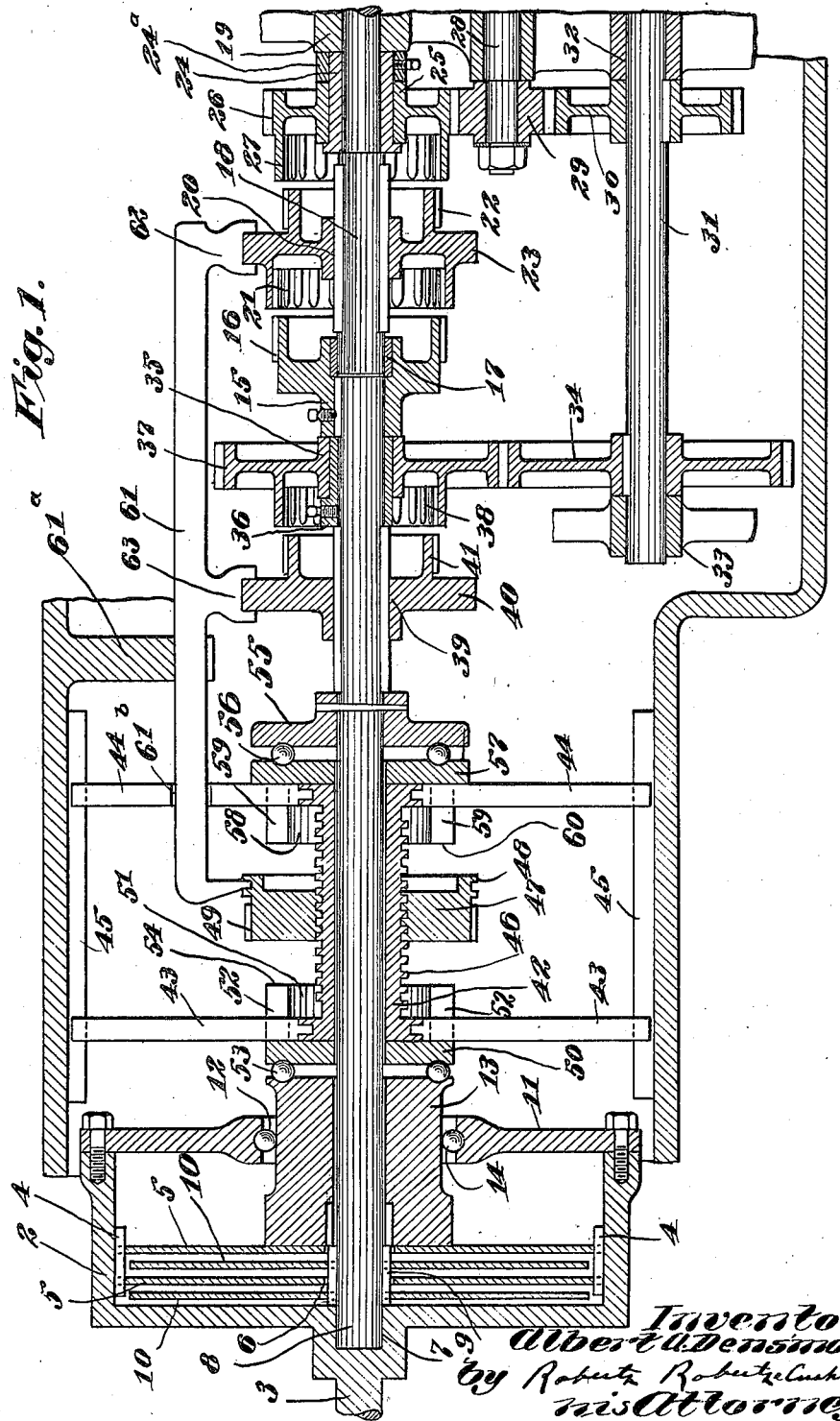
Fig. 1 is a vertical cross section taken through the longitudinal axis of the drive shaft.

Referring to Fig. 1, the transmission casing is indicated generally at 1, such casing being of any desired shape and construction and serving to house the transmission mechanism. Extending into one end of the casing 1 is a clutch housing 2, such housing comprising a substantially cylindrical box-like structure integral with or secured in any desired manner to the end of the drive shaft 3. The inner peripheral wall of the housing 2 is provided with one or more longitudinal ribs or keys 4 with which engage slots formed in the edges of friction discs such as 5, these discs having central openings at 6. The discs 5 are longitudinally slidable within the housing 2, but are non-rotatable therein, being held against rotation by the engagement of their slots with the ribs 4. The housing 2 is provided with a bearing opening or socket at 7 aligning with the shaft 3, such socket serving for the reception of an end of an intermediate drive shaft 8. This shaft, within the housing 2, is provided with one or more longitudinal keys as 9, with which engage radial slots formed in friction discs such as 10. The discs 5 and 10 are arranged in alternation, the discs 10 being slidable longitudinally of the shaft but being held against rotation relative thereto by the engagement of their slots with the ribs or keys 9. The discs 10 are of a diameter such that they are free from engagement with the ribs 4. By pressing the several discs into contact, the shaft 8 may be frictionally clutched to the shaft 3 to be driven thereby in a usual manner.

The end wall 11 of the housing 2 is provided with an opening 12 within which is arranged a sleeve 13 constituting a pusher member by means of which the several discs are pressed into operative engagement. The sleeve 13 is slidable on the shaft 8, and anti-friction bearings such as indicated at 14 may be interposed between such sleeve and the member 11. The shaft 8 extends to the right through the casing 1 and adjacent its right hand extremity has secured thereto the hub 15 of an external gear like member 16 acting as a clutch element. The hub 15 is provided with a suitable opening for the reception of a bearing ring or bushing 17 which may be of hardened material if desired. This bearing ring serves for the reception of the left hand end of a shaft 18 having bearing at 19 in a bracket carried by the casing 1. This shaft 18 may be the propeller shaft of a boat or any other driven shaft whose driving it is desired to control.

The hub 20 of a compound gear like member comprising the internal toothed portion 21 and the external toothed portion 22 is splined for sliding movement upon the shaft 18 at a point intermediate the bearings 17 and 19 and forms a double-faced selective clutch member. This member also comprises a flange 23, the purpose of which will be evident as the description proceeds. By sliding the compound clutch member, just described, to the left, as viewed in Fig. 1, the portion 21 may be brought into driving engagement with the clutch element 16 and thus shafts 8 and 18 may be coupled together for direct driving. At a point adjacent the bearing 19, a bushing 24 is mounted upon the shaft 18, and carried by said bushing is the hub 25 of a compound member comprising the external gear member 26 and the internal clutch face 27, the hub 25 being free to rotate relatively to the shaft 18 but being retained against endwise movement thereon. Upon moving the compound member having the portion 22, to the right as viewed in Fig. 1, such portion may be caused to operatively engage the internal clutch face 27, thus connecting the shaft 18 for rotation by the gear 26.

A stub shaft 28 is secured within a suitable opening in a bracket extending from the wall of the casing 1 and upon said stub shaft there is mounted for free rotation a pinion 29 which meshes with the gear member 26 above described. The pinion 29 meshes with a spur gear or pinion 30 fast upon a jack shaft 31 having bearings at 32, 33, respectively, in brackets carried by the casing 1. A pinion 34 is also fixed to the shaft 31, such latter pinion being of a diameter substantially larger than the pinion 30. To the left of the hub 15 above described, a hub 35 is mounted for free rotation upon the shaft 8. Such hub may be retained against endwise movement on the shaft by means of a shouldered bushing 36. The hub 35 forms a part of a compound member comprising the gear 37 and the clutch member 38, the gear 37 meshing with the gear 34.

A hub 39 is splined for longitudinal sliding movement upon the shaft 8, being rotatable therewith, such hub carrying a radial flange member 40 and a clutch member 41. Upon movement of the hub 39 to the right, as viewed in Fig. 1, the member 41 may be caused to mesh with or operatively engage the clutch member 38, and if at the same time the clutch member 22 be engaged with the clutch member 27, rotation of shaft 8 serves, through the mechanism just described, to drive shaft 18 at the same velocity as shaft 8 but in the reverse direction.

Upon the shaft 8, to the right of the sleeve member 13, there is mounted a sleeve 42, such sleeve having, if desired, enlarged extremities from which extend radial arms such as 43, 44. These arms may constitute elements of an integral spider of which the sleeve 42 is the hub, or if desired, may comprise independent elements suitably secured to the ends of the sleeve 42. The ends of the radial arms 43, 44 engage longitudinal guideways indicated generally at 45 formed upon the inner walls of the casing 1. These guideways may comprise slots with which the ends of the arms 43, 44 engage, or if desired, may take the form of ribs with which suitable slots in the ends of such arms engage. Whether one or the other arrangement is employed, the main purpose of the arrangement is to secure the sleeve 42 against rotation with the shaft 8 while at the same time permitting longitudinal movement of the sleeve upon the shaft. The sleeve also provides an additional support for the shaft 8 at a point between the bearings 7 and 17. The sleeve 42 is externally screw threaded as indicated at 46 and engaging such screw threaded portion is an internally threaded nut member 47. This nut member comprises a circumferentially grooved radial flange 48, and if desired, an external gear 49, such gear serving as a convenient means whereby the nut may be rotated. While the term "nut" is employed herein in describing the element 47, it is to be understood that the term is used in a generic sense as indicating any part rotatable upon the sleeve 46 and having threaded engagement therewith.

A movable abutment member 50 is arranged to slide upon the shaft 8, such abutment comprising a cylindrical portion 51 having suitably disposed slots 52 for the reception of the arms 43, whereby relative movement of the abutment 50 and such arms is permitted and at the same time the abutment 50 is secured against rotation with the shaft. Interposed between the abutment 50 and the adjacent end of the sleeve 13, anti-friction bearings as 53 may be provided. The opposite end of the abutment 50 provides engaging surfaces 54 against which the adjacent face of the nut 47 may be caused to abut. A fixed abutment is also provided at the opposite side of the nut 47, such abutment comprising the disc member 55 secured to the shaft 8 as by means of a pin or in any other desired manner. With the disc 55 engage anti-friction bearings such as 56 which are interposed between the disc and a second disc member 57 mounted upon the shaft. The disc member 57 carries a cylindrical member 58 provided with slots 59 through which pass the arms 44, such arms serving to prevent rotation of the member 57 but being freely slidable longitudinally with respect thereto. The left-hand face 60 of the member 58 serves for engagement with the right-hand face of the nut 47 as the latter is moved to the right.

A connecting bar 61 is suitably guided for sliding movement in a bracket 61ª extending from the interior wall of the casing 1 and also passes through an opening 61ᵇ in one of the arms 44. This bar 61 is provided with fork members 62, 63, 64 which engage the flanges 23, 40 and 48, respectively above described. By this arrangement any longitudinal movement of the nut 47 is transmitted to the members 40 and 23, whereby the clutch 41 and the compound member comprising the parts 21, 22 are moved simultaneously with the movement of the nut 47.

Referring to Figs. 2 and 3, a pair of treadle members 65, 66 are illustrated, such members being carried at the outer ends of lever arms 67, 68, respectively. These lever arms are fixed to shafts rotatable in suitable bearings provided in brackets 69, 70. Upon the outer ends of such shafts, segmental gears 71, 72 are fixed, such gears meshing with pinions 73, 74, respectively, carried upon parallel shafts 75, 76. The latter shafts are mounted for rotation in suitable brackets 77, 78, respectively, supported upon the casing 1 or in any other desired position. Splined upon the shafts 75, 76 are flanged gears 79, 80, respectively, such gears being rotatable with the shafts and slidable thereon. The gears 79, 80 are disposed upon opposite sides of the gear 49 carried by the nut 47 and mesh therewith. With this arrangement of parts, depression of one of the treadle members, as 65, serves to rotate the gear 49 and the nut 47 in one direction, while depression of the other treadle serves to rotate such gear and nut in the opposite direction. It will be evident from inspection of the parts illustrated in Fig. 2, that upon depression of one treadle the other is automatically elevated.

While friction discs of ordinary form may be employed in the housing 2, it is preferred to use discs of the type indicated generally in Figs. 5 and 6, wherein the discs are shown as formed of sheet material having radial corrugations indicated at 81, 82. Such discs may be provided with central openings 83 and with slots or notches 84 for engagement with the key 9, it being understood that the cooperating discs will be provided with notches or slots at their peripheral edges for engagement with the ribs 4. By the employment of discs such as indicated in Figs. 5 and 6, a firmer engagement of the clutch elements may be secured without employing so great pressure for holding them in contact.

The operation of the device as above described is generally as follows, it being noted that with the parts as indicated in Fig. 1, the clutch elements are disengaged, while at the same time the various shiftable portions of the gear transmission mechanism are also disengaged one from the other.

If now it be desired to drive the shaft 18 directly from the shaft 8 and in the same direction, as for forward driving, the proper treadle will be depressed, thereby rotating the gear 49 and the nut 47 in a direction such as to cause the nut to travel longitudinally upon the sleeve 46 to the left as viewed in Fig. 1. During the first portion of this movement, the fork 62, by engagement with the flange 23, moves clutch member 21 to the left and brings it into engagement with the clutch member 16. This movement of the nut 47 causes it to engage the surface 54 of the abutment member 50 and as the sleeve 42 is unable to move to the right by reason of its engagement with the fixed abutment comprising the disc 55, the presser member 13 is moved to the left, thus bringing the clutch discs into driving engagement. The shaft 8 is now constrained to move with the shaft 3, and as the clutch members 21 and 16 have previously been brought into engagement, the shaft 18 is driven at substantially the same speed as shaft 3, the friction clutch arrangement however serving to avoid any sudden shock in starting the shaft 18. If it be desired to drive the shaft 18 in a direction opposite to the shaft 8, it is simply necessary to depress the other treadle, whereupon the gear 49 is rotated in the opposite direction. If the parts have already been engaged for direct driving, the first result of such movement is to carry the gear 49 and the nut 47 away from the abutment member 50, thus permitting the clutch discs to spring apart and stopping the rotation of the shaft 8. At the same time the clutch members 21 and 16 are disengaged. Upon further depression of such treadle the nut member 47 is brought into engagement with the surface 60 of the member 57 while at the same time or just previous thereto, the clutch member 22 is caused to engage with the clutch member 27 and the clutch member 41 is caused to mesh with the clutch member 38. As the nut is now further rotated, and as its bodily movement to the right is prevented by the fact that the abutment member 57 is fixed as respects longitudinal movement relatively to the shaft 8, the sleeve 46 is caused to travel to the left, as viewed in Fig. 1. Such movement of the sleeve carries with it the arms 43, 44, which as above described, slide longitudinally of the casing 1. As the left-hand end of the sleeve 46 abuts the member 50, the latter is also moved to the left, carrying the sleeve 13 therewith. Such movement results in engagement of the clutch discs and thus couples the shaft 8 to the shaft 3. Rotation of the shaft 8 now operates, through the reverse gearing, including the jack shaft 31, to drive the shaft 18 in a direction opposite to the shaft 8 and at the same speed. It is thus evident that merely by depressing one or the other of the treadles 55, 56, the shaft 18 may receive movement from the shaft 3, either in the same or reverse direction, or may be brought to rest, and that the driving of shaft 18 will be produced through the intermediary of a friction clutch, thus avoiding the application of any sudden load to the engine shaft, such as might be caused were the friction clutch not provided.

The mechanism provided is simple in construction and such as is not liable readily to get out of order and requires but little conscious effort on the part of the operator to produce the desired results, either in bringing the driving shaft to rest or in causing it to rotate forwardly or in a reverse direction. The provision of the screw threaded connections between the actuating member 47 and the parts controlled thereby serves in an efficient and simple manner to hold the parts in adjusted position, thus eliminating the necessity for employing pawls or other locking devices, while at the same time making it unnecessary for the operator to maintain any substantial pressure upon the treadles during the ordinary operation of the driving shaft.

Having thus described the invention in a preferred embodiment of the same, what I claim and desire to secure by Letters Patent of the United States is:

1. A power transmission device having a movable clutch element, and means for moving said element, said means comprising a non-rotatable, screw-threaded member, and a nut for engaging said member, the parts being so constructed and arranged that upon rotation of the nut in one direction it moves bodily along said member whereby to move said clutch element, and upon rotation in the opposite direction moves said member bodily whereby to move said clutch element.

2. A power transmission mechanism comprising a shaft, a clutch element slidably mounted thereon, a non-rotatable externally screw-threaded sleeve slidable upon said shaft, a nut engaging the threads of the sleeve, a fixed abutment carried by the shaft and engageable by one end of said sleeve, and a movable abutment interposed between said clutch element and said nut.

3. A power transmission mechanism comprising a shaft having a slidable clutch element thereon, an externally screw-threaded sleeve slidable upon said shaft, means for preventing rotation of said sleeve, a nut engaging said sleeve, abutment members disposed upon opposite sides of said nut, one of said abutments being fixed to the shaft, and a pressure applying element interposed between the other abutment and said slidable clutch element.

4. A power transmission mechanism comprising a slidable clutch element, an externally screw threaded, longitudinally movable non-rotatable sleeve, a nut engaging said sleeve, a fixed abutment for one end of the sleeve limiting movement thereof in one direction and a movable abutment interposed between said last named abutment and the slidable clutch element, each of said abutments comprising elements engageable by said nut.

5. A power transmitting device comprising a drive shaft and a driven shaft, relatively movable clutch members connected to the respective shafts, a non-rotatable sleeve mounted upon the driven shaft, said sleeve being externally screw threaded, a nut engaging the threads of said sleeve, and means including spaced abutment members engageable with said nut, so constructed and arranged that upon rotation of said nut in either direction said clutch members are brought into driving relationship.

6. Mechanism of the class described comprising a casing, a shaft rotatable therein, a movable clutch disc mounted upon the shaft, an externally screw threaded sleeve slidable upon the shaft, radially extending arms projecting from opposite ends of said sleeve and slidably engaging longitudinal guideways upon the interior of the casing, abutment members mounted upon said shaft and having longitudinal slots for the passage of said arms.

7. Power transmission mechanism comprising a casing having diametrally disposed, longitudinal guideways upon its inner wall, a shaft mounted for rotation within said casing, an externally screw threaded sleeve slidable upon said shaft, oppositely extending, radial arms secured to said sleeve and having their free ends engaging in the respective guide slots, whereby to prevent rotation of the sleeve, a nut engaging the threads of said sleeve, engageable power transmitting elements, and abutment means interposed between said element and said nut.

8. A power transmission mechanism comprising a rotatable shaft having a clutch disc slidably keyed thereto, a threaded sleeve slidable upon the shaft, means for preventing rotation of the sleeve, a rotatable nut engaging said sleeve, an abutment member carried by the shaft and fixed against axial movement therealong, said abutment member comprising elements engageable by said sleeve and nut respectively, a second abutment movable longitudinally of the shaft and having elements engageable with the sleeve and nut respectively, and a pressure member slidable upon the shaft and interposed between said second abutment member and said clutch element.

9. Power transmission mechanism comprising a drive shaft having a clutch case fast thereon, a driven shaft extending into said case, relatively movable clutch discs keyed to the respective shafts, a pressure applying member extending into said case, anti-friction bearings between said member and the wall of the case, an abutment member slidable upon the shaft, anti-friction bearings between said abutment and said pressure applying member, and a member rotatable about the axis of the shaft for moving said abutment member.

10. In a power transmitting mechanism having a slidable clutch element and a screw threaded member for moving said element, an abutment for said threaded member comprising a disc keyed to the shaft, a second disc freely rotatable upon the shaft, and anti-friction bearings between said discs.

11. A power transmission mechanism comprising a plurality of shafts, a clutch having relatively movable clutch elements, shiftable means for alternatively connecting two of said shafts for direct or reverse driving, a rotatable, internally threaded member, and means whereby upon rotation of said member said clutch element is actuated to connect two of said shafts and one of said shiftable means is moved to connect two of said shafts.

12. A transmission mechanism having three axially aligned shafts, relatively movable clutch elements for connecting two of said shafts, means including a plurality of shiftable means for directly or reversely coupling the thread shaft to one of said first named shafts, and simultaneously actuable means for moving said clutch elements and one of said shiftable means into operative position, said actuable means including a rotatable nut.

13. A transmission mechanism having three aligned shafts, clutch means for connecting two of said shafts, means for directly or reversely connecting the third shaft with one of said first named shafts, said means comprising a pair of alternatively operable and longitudinally shiftable clutch elements, a rotatable nut, and connections between said nut and said shiftable elements whereby upon rotation of said nut in one direction said shafts are directly connected and upon rotation of the nut in the opposite direction the shafts are reversely rotated.

14. A power transmission mechanism comprising a pair of aligned shafts, a clutch member fixed upon the end of one shaft, a slidable clutch member mounted upon the other shaft and engageable with the first clutch member, a driving shaft, relatively movable clutch elements carried by said drive shaft and the shaft having the fixed clutch member, a rotatable screw threaded nut operable to engage said second clutch elements and a yoke member connecting said nut with said slidable clutch member whereby, upon rotation of the nut, to bring said clutch members into driving engagement.

15. A power transmission mechanism comprising a pair of aligned shafts, a clutch member fixed adjacent the end of one shaft, a compound clutch member slidable upon the other shaft, said compound clutch being engageable with said first clutch member, a compound gear and clutch member loose upon said second shaft, the clutch portion thereof being engageable by said compound clutch member, a compound gear and clutch member loose on said first shaft, a slidable clutch member upon said latter shaft and engageable with the compound member last named, a jack shaft having pinions engaging the external gears of said two loose, compound members respectively, a connecting bar for simultaneously shifting said two slidable clutch members in the same direction, and a screw threaded member for adjusting said bar.

16. A power transmission mechanism comprising relatively movable clutch elements, a pair of treadles, means interconnecting said treadles whereby depression of one serves to elevate the other, and means whereby depression of either treadle serves to operatively engage said clutch elements.

17. In a mechanism of the class described, engageable clutch elements, a rotatable threaded member, connections between said threaded member and said clutch elements whereby upon rotation of said member in either direction said elements are operatively engaged, and a pair of treadles so connected to said rotatable member that upon depression of one treadle said member is rotated in one direction and upon depression of the other treadle it is rotated in the opposite direction.

18. A power transmission mechanism comprising engageable clutch elements, gears for direct and reverse driving, a pair of treadles, and intermediate connections so constructed and arranged that upon depression of one of said treadles the direct drive gear and the clutch elements are successively made operative to transmit power, and upon depression of the other treadle the reverse drive gear and the clutch elements are successively made operative to transmit power.

Signed by me at Boston, Massachusetts, this 18th day of June 1921.

ALBERT A. DENSMORE.